(12) United States Patent
Chan et al.

(10) Patent No.: US 11,143,523 B2
(45) Date of Patent: Oct. 12, 2021

(54) PROVIDING RAISED PATTERNS AND HAPTIC FEEDBACK FOR MAPPING APPLICATIONS

(71) Applicant: International Business Machines Corporation, Armonk, NY (US)

(72) Inventors: Yuk L. Chan, Rochester, NY (US); Michael D. Essenmacher, Danbury, CT (US); David B. Lection, Raleigh, NC (US); Eric L. Masselle, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/154,979

(22) Filed: Oct. 9, 2018

(65) Prior Publication Data

US 2020/0109964 A1    Apr. 9, 2020

(51) Int. Cl.
*G01C 21/36* (2006.01)
*G06F 3/01* (2006.01)
*G06F 3/0488* (2013.01)

(52) U.S. Cl.
CPC ....... *G01C 21/3652* (2013.01); *G01C 21/367* (2013.01); *G01C 21/3676* (2013.01);
(Continued)

(58) Field of Classification Search
CPC .............. G01C 21/3652; G01C 21/367; G01C 21/3676; G01C 21/3626; G06F 2203/04809; G06F 3/016; G06F 3/0488
(Continued)

(56) References Cited

U.S. PATENT DOCUMENTS

| 8,345,013 B2 | 1/2013 | Heubel et al. |
| 9,373,233 B2 | 6/2016 | Birnbaum |

(Continued)

FOREIGN PATENT DOCUMENTS

| WO | 2012/074634 A1 | 6/2012 | |
| WO | WO-2012074634 A1 * | 6/2012 | ............. G06F 3/041 |

OTHER PUBLICATIONS

Kim et al.; "Tactile Rendering of 3D Features on Touch Surfaces"; UIST'13, Oct. 8-11, 2013; St. Andrews, United Kingdom; 8 pages. (Year: 2013).*
Anonymous; "A touchscreen with keys that rise and disappear"; CNN; Jun. 6, 2012; 2 pages.
Anonymous; "Less-distracting haptic feedback could make car navigation safer than GPS audio and displays"; Kurzweil Accelerating Intelligence News; Feb. 15, 2016; 4 pages.
(Continued)

*Primary Examiner* — Maceeh Anwari
(74) *Attorney, Agent, or Firm* — Cantor Colburn LLP; Teddi Maranzano

(57) ABSTRACT

Provided are systems, methods, and media for tactile map-based navigation on a reconfigurable display surface. An example method includes receiving an input destination for a user, generating a navigational route to the destination based on a current location of the user, and transmitting a control signal to the reconfigurable display surface to cause the mobile display surface to render the navigational route on a map of a geographic area. The rendering of the navigational route includes changing topography of the reconfigurable display surface such that a first three-dimensional (3D) shape is formed on the map at a position of the current location and a second 3D shape is formed on the map at a position of the destination.

17 Claims, 9 Drawing Sheets

(52) U.S. Cl.
CPC ............ *G06F 3/016* (2013.01); *G06F 3/0488* (2013.01); *G06F 2203/04809* (2013.01)

(58) Field of Classification Search
USPC ........................................................ 701/418
See application file for complete search history.

(56) References Cited

U.S. PATENT DOCUMENTS

| | | |
|---|---|---|
| 2012/0206248 A1 | 8/2012 | Biggs |
| 2013/0009892 A1 | 1/2013 | Salmela |
| 2015/0160029 A1* | 6/2015 | Kobayashi ............. B60L 53/14 701/32.3 |
| 2016/0170508 A1 | 6/2016 | Moore et al. |
| 2018/0348865 A1* | 12/2018 | Czelnik ................. B60K 37/06 |

OTHER PUBLICATIONS

Anonymous; "Taking Touch Screen Interfaces Into A New Dimension"; A Tactus Technology White Paper (2012); 13 pages.
Brewster; "This Wristband Can Trace Your GPS Directions on Your Skin"; MIT Technology Review; Aug. 16, 2016; 6 pages.
Hurst; "Can You Feel Me Now? The Sensational Rise of Haptic Interfaces"; Wired.com; Feb. 13, 2013; 11 pages.
Kim et al.; "Tactile Rendering of 3D Features on Touch Surfaces"; UIST'13, Oct. 8-11, 2013; St. Andrews, United Kingdom; 8 pages.
Mell et al.; "The NIST Definition of Cloud Computing- Recommendations of the National Institute of Standards and Technology"; U.S. Department of Commerce; Sep. 2011; 7 pages.
Ziegler; "BMWs of the future will have Samsung tablets and gesture"; The Verge; Jan. 6, 2015; 2 pages.

\* cited by examiner

PROVIDING RAISED PATTERNS AND HAPTIC FEEDBACK FOR MAPPING APPLICATIONS

BACKGROUND

The present invention generally relates to changeable topography devices and more specifically to systems, computer-implemented methods, and computer program products that dynamically reform surfaces to provide raised patterns and haptic feedback for mapping applications such as Global Positioning System (GPS) navigational devices.

GPS devices are utilized to provide vehicle navigation and other types of visual information to users. For example, GPS systems may provide traffic information, turn-by-turn directions, and point-of-interest information. One technical issue with GPS devices is that they often provide information visually, which causes drivers of the vehicles to take their eyes off of the road when viewing the information.

SUMMARY

Embodiments of the present invention provide a computer-implemented method for tactile map-based navigation on a reconfigurable display surface. A non-limiting example of the computer-implemented method includes receiving, by a system comprising one or more processors, an input destination for a user. The method includes generating, by the system, a navigational route to the destination based on a current location of the user. The method includes transmitting, by the system, a control signal to the reconfigurable display surface to cause the mobile display surface to render the navigational route on a map of a geographic area, in which the rendering of the navigational route includes changing topography of the reconfigurable display surface such that a first three-dimensional (3D) shape is formed on the map at a position of the current location and a second 3D shape is formed on the map at a position of the destination.

Embodiments of the present invention provide a system for tactile map-based navigation on a reconfigurable display surface. The system includes one or more processors that are configured to perform a method. A non-limiting example of the method includes receiving, by the system, an input destination for a user. The method includes generating, by the system, a navigational route to the destination based on a current location of the user. The method includes transmitting, by the system, a control signal to the reconfigurable display surface to cause the mobile display surface to render the navigational route on a map of a geographic area, in which the rendering of the navigational route includes changing topography of the reconfigurable display surface such that a first three-dimensional (3D) shape is formed on the map at a position of the current location and a second 3D shape is formed on the map at a position of the destination.

Embodiments of the invention provide a computer program product for tactile map-based navigation on a reconfigurable display surface, in which the computer program product includes a computer readable storage medium having program instructions embodied therewith. The program instructions are executable by a system comprising one or more processors to cause the system to perform a method. A non-limiting example of the method includes receiving, by the system, an input destination for a user. The method includes generating, by the system, a navigational route to the destination based on a current location of the user. The method includes transmitting, by the system, a control signal to the reconfigurable display surface to cause the mobile display surface to render the navigational route on a map of a geographic area, in which the rendering of the navigational route includes changing topography of the reconfigurable display surface such that a first three-dimensional (3D) shape is formed on the map at a position of the current location and a second 3D shape is formed on the map at a position of the destination.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
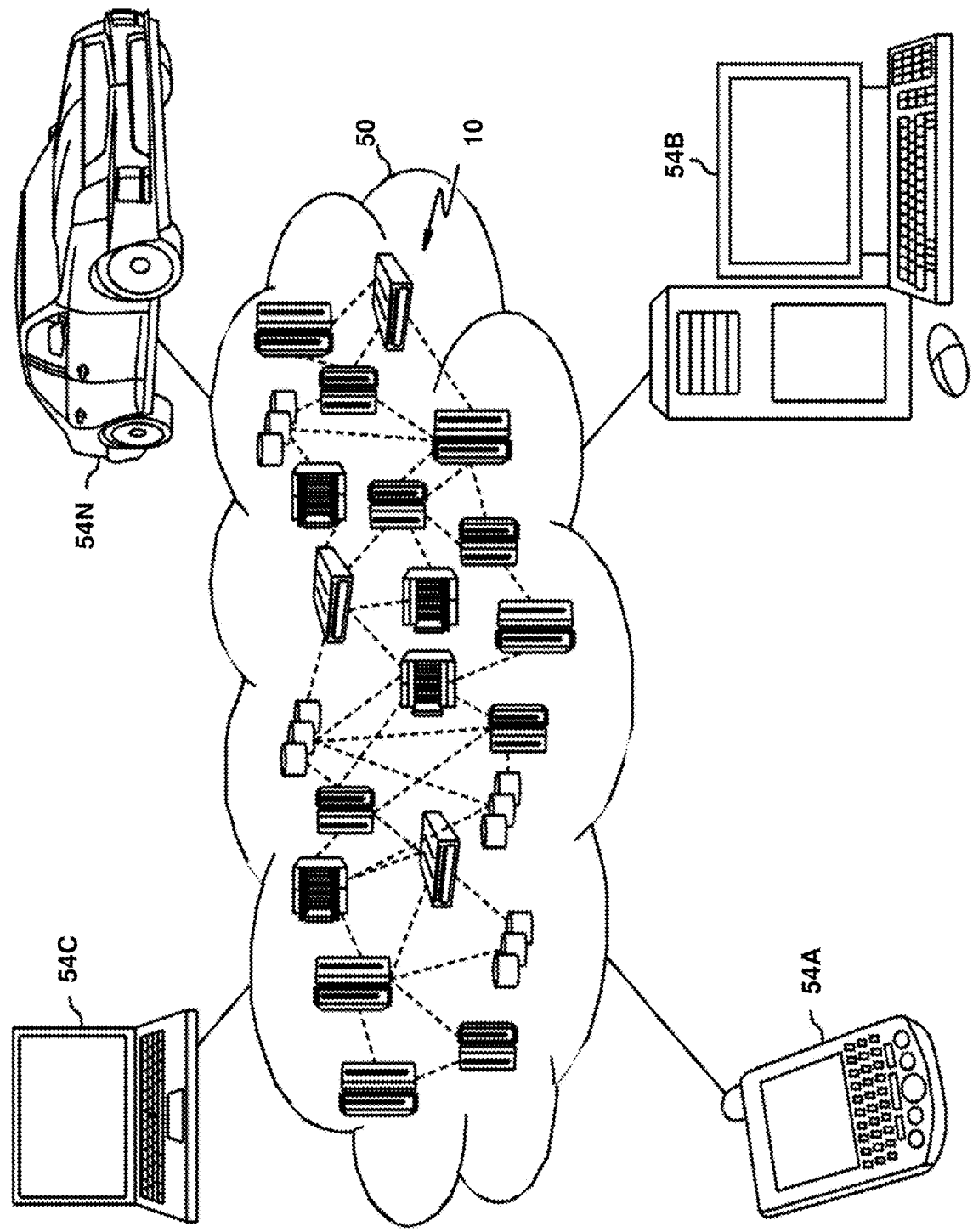
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
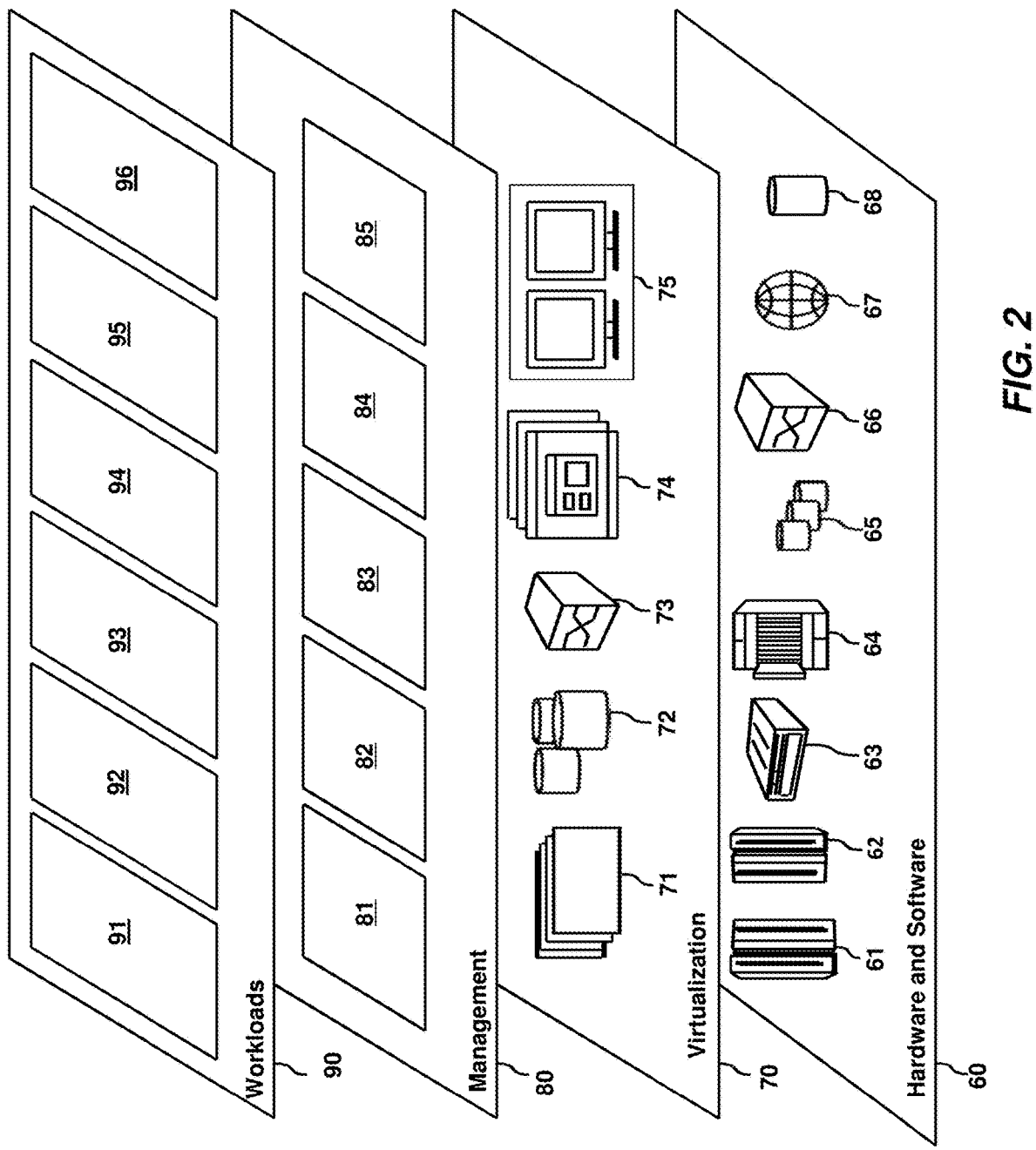
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GPS navigation processing 96.

Turning now to an overview of technologies that are more specifically relevant to aspects of the invention, as noted above, GPS devices are often utilized to provide vehicle navigation and other types of visual information to users. For example, GPS systems may provide traffic information, turn-by-turn directions, and point-of-interest information. One technical issue with GPS devices is that they often provide information visually, which causes drivers of the vehicles to take their eyes off of the road when viewing the information.

Turning now to an overview of the aspects of the invention, one or more embodiments of the invention address the above-described shortcomings of the prior art by providing a driver of a vehicle a display device (e.g., a GPS display, smartphone, etc.) that allows the driver to feel mapping information through the use of one or more fingers on the display device. Haptic feedback is provided through vibration and raised areas that are formed on the display device, which together provide a dual channel haptic feedback. For example, in some embodiments of the present invention, the display device superimposed raised areas on a GPS map to allow the user to feel their current location and the distance to a destination in relative terms.

Figure 3:
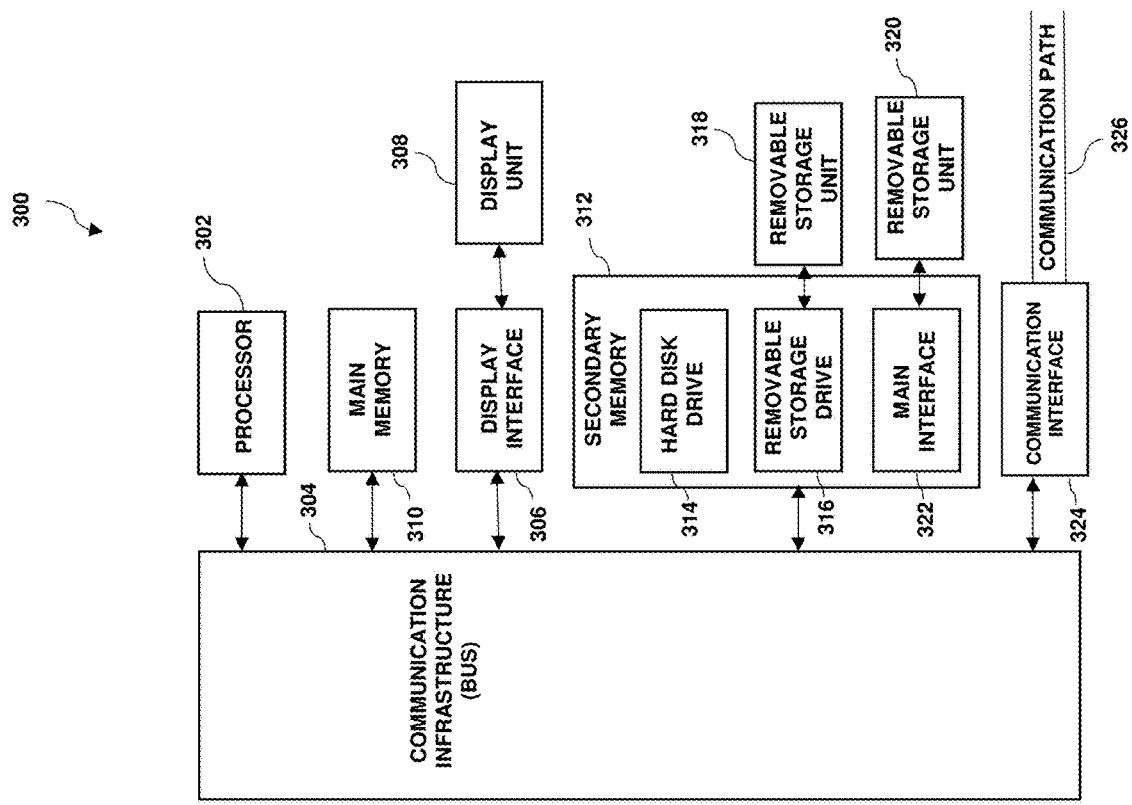
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that can be used to implement one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
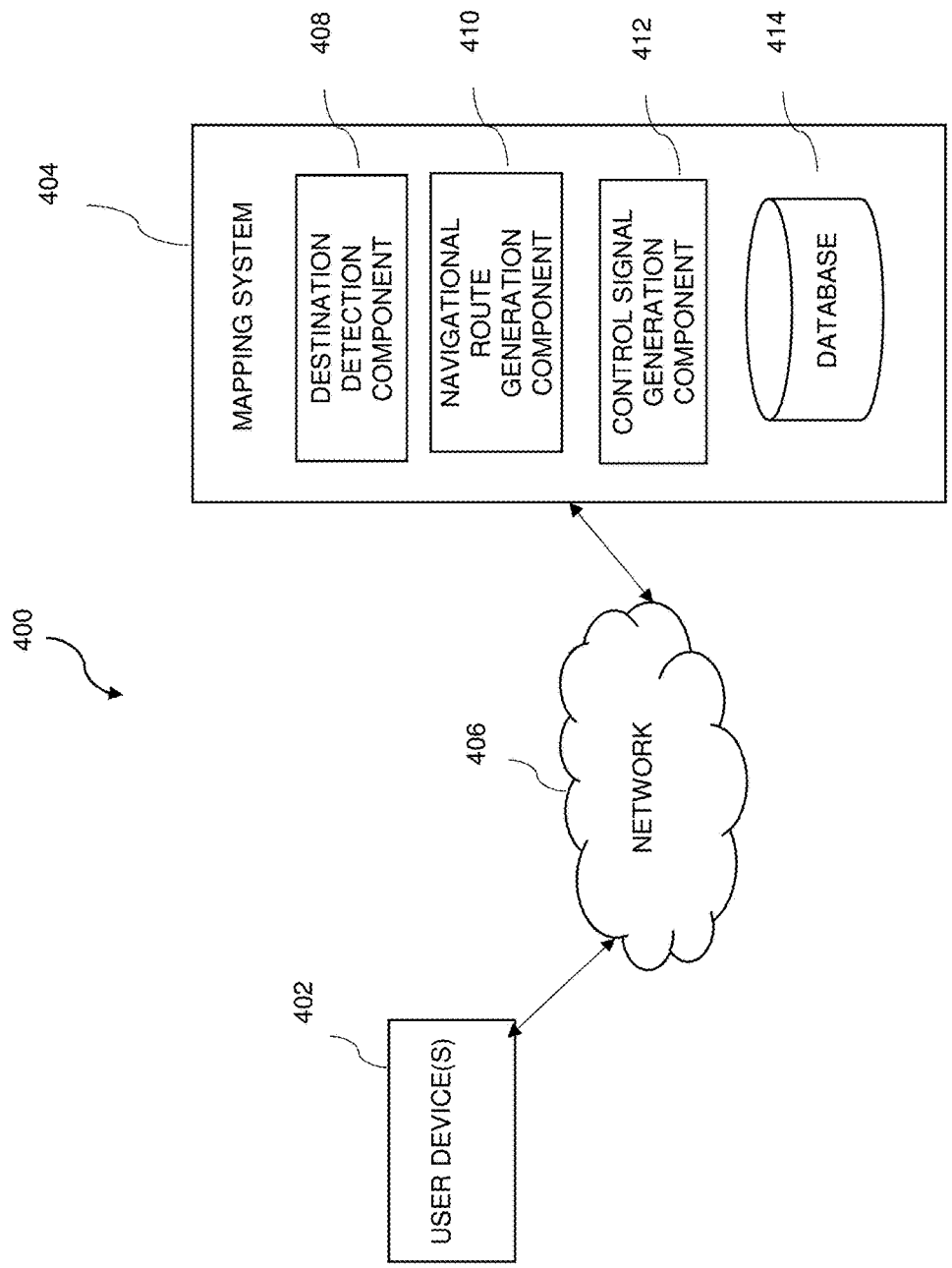
FIG. 4 depicts an example distributed environment for providing raised patterns and haptic feedback for mapping applications in accordance with one or more embodiments of the present invention.

Referring now to FIG. 4, an example distributed environment 400 is presented for providing raised patterns and haptic feedback for mapping applications. Distributed environment 400 includes a mapping system 404, and in some embodiments of the present invention includes one or more user devices 402 that includes a reconfigurable display surface, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. For example, in some embodiments of the present invention, mapping system 404 includes a reconfigurable display surface does not include one or more user devices 402.

Mapping system 404 includes a destination detection component 408, a navigational route generation component 410, a control signal generation component 412, and one or more databases 414. In some embodiments of the present invention, destination detection component 408, navigational route generation component 410, control signal generation component 412, and/or databases 414 are interconnected via a communication infrastructure 304 and/or communication path 326. Mapping system 404 may have internal and external hardware components, such as those depicted and described above with respect to FIG. 3.

In some embodiments of the present invention, mapping system 404 forms part of a multithreaded computer system operating in a concurrent programming environment. In general, in concurrent programming environments, a set of processes may be executed on one or more processors (e.g., processor 302). A process refers to a unit of concurrent programming (e.g., a program or section of a program). Multiple processes may execute the same section of the program simultaneously and each process may, in turn, include multiple threads. A process thread refers to a sub-element of a process or a stream of instructions simultaneously executed within the same program. In concurrent programming, a multithreading processing technique may be employed that enables two or more of the same type of transaction to be carried out simultaneously. Each stream processes a different transaction message.

In some embodiments of the present invention, mapping system 404 is a standalone computing device, a management server, a web server, a mobile computing device, or other suitable electronic device and/or computing system capable of receiving, sending, and processing data. In some embodiments of the present invention, mapping system 404 is a server computing system utilizing multiple computers, such as in cloud computing environment 50 (FIG. 1). In some embodiments of the present invention, mapping system 404 is a laptop computer, a tablet computer, a netbook computer, a personal computer (PC), a desktop computer, a personal digital assistant (PDA), a smartphone, or other suitable programmable electronic device capable of communicating with user device 402, and other computing devices (not shown) within distributed environment 400 via network 406. In some embodiments of the present invention, mapping system 404 is a computing system utilizing clustered computers and components (e.g., database server computers, application server computers, etc.) that act as a single pool of seamless resources that are accessible within distributed environment 400. Mapping system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, mapping system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information from user device 402 to mapping system 404, which in turn allows users to access destination detection component 408, a navigational route generation component 410, a control signal generation component 412, and database(s) 414. In some embodiments of the present invention, user device 402 is a laptop computer, a tablet computer, a netbook computer, a personal computer (PC), a desktop computer, a personal digital assistant (PDA), a smartphone, an Internet-of-things (IoT) enabled device, and/or other suitable programmable electronic devices capable of communicating with various components and devices within distributed environment 400. In some embodiments of the present invention, user device 402 is a programmable electronic mobile device or a combination of programmable electronic mobile devices capable of executing machine-readable program instructions and communicating with other computing devices (not shown) within distributed environment 400. In some embodiments of the present invention user device 402 includes a GPS device to detect a present location of a user of the user device 402. In some embodiments of the present invention, user device 402 may include internal and external hardware components, such as those depicted and described above with respect to FIG. 3.

Figure 5A:
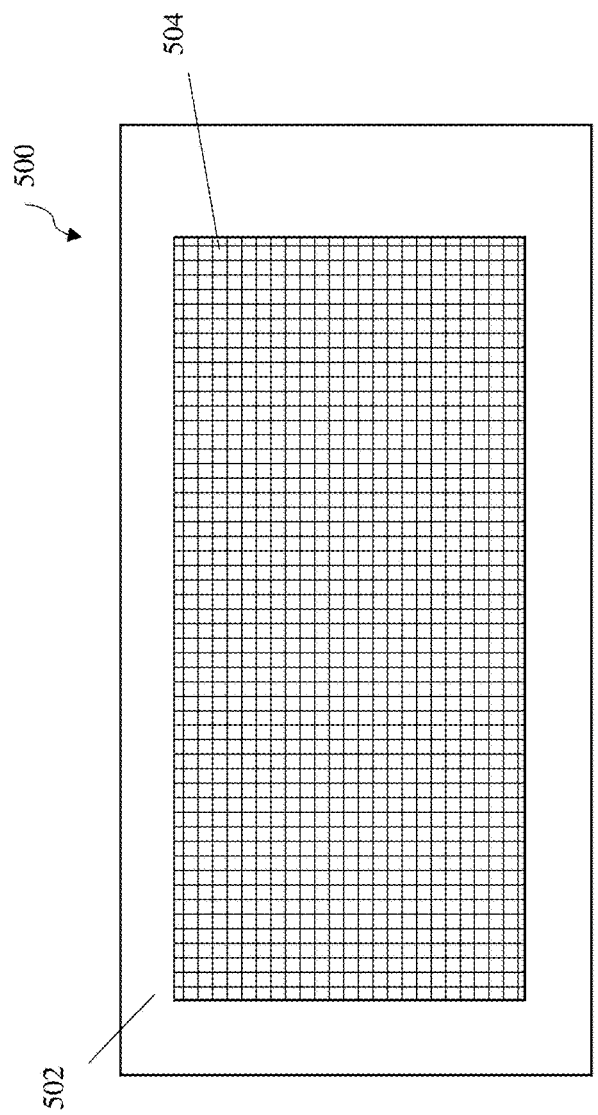
FIG. 5A depicts a top down view of an example reconfigurable display surface that allows for the changing of a topography in accordance with one or more embodiments of the present invention.
Figure 5B:
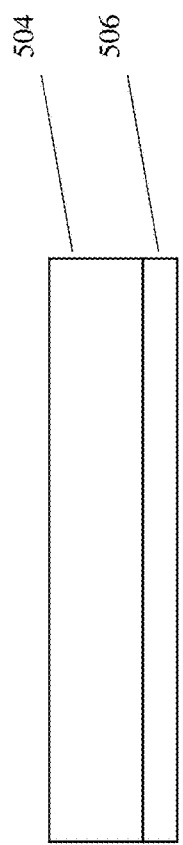
FIG. 5B depicts a side view of the example reconfigurable display surface of FIG. 5A in accordance with one or more embodiments of the present invention.

User device 402 includes a display device that is configured to present a navigational route with 3D objects in accordance with one or more embodiments of the present invention. Various suitable types of display devices may be utilized to generate 3D objects and provide haptic feedback. FIGS. 5A-5B present one example of a suitable display device (e.g., reconfigurable display surface 500) that may be utilized in accordance with one more embodiments of the present invention.

In particular, FIGS. 5A and 5B illustrate an example reconfigurable display surface 500 that allows for the changing of a topography in accordance with one or more embodiments of the present disclosure. FIG. 5A is a top down view of reconfigurable display surface 500, and FIG. 5B is a side view of an individual cell of reconfigurable display surface 500. As illustrated in FIGS. 5A-5B, in some embodiments of the present invention, reconfigurable display surface 500 includes a grid 502 having a plurality of moveable grid cells 504, in which the plurality of moveable grid cells 504 are each able to independently move to change a topography of reconfigurable display surface 500. In some embodiments of the present invention, reconfigurable display surface 500 is a subcomponent of an electronic device, such as a computer, tablet, or cellphone for example. A user may interact with the electronic device via one or more input interfaces, for example via reconfigurable display surface 500. Reconfigurable display surface 500 and/or an electronic device that includes reconfigurable display surface 500 may further include various components and interfaces, such as, for example a microphone and/or camera.

In some embodiments of the present invention, a change in topography and/or shape of grid 502 of the reconfigurable display surface 500 is performed by changing one or more characteristics of one or more cells of the plurality of moveable grid cells 504. In some embodiments of the present invention, the changes characteristics include one or more of a change in height, width, length, orientation, configuration, layout, texture, pattern, three-dimensional form, or the like for one or more cells of the plurality of grid cell 504 of the grid 502 of reconfigurable display surface 500. For example, in some embodiments of the present invention, a topographical change of reconfigurable display surface 500 is implemented by physically altering a height/depth of individual cells of the plurality of moveable grid cells 504, and/or by physically altering a subset of cells of the plurality moveable grid cells 504.

In some embodiments of the present invention, each moveable grid cell of grid 502 includes a mechanical device, such as an actuator, that is configured to change between physical states, thus allowing for the plurality of moveable grid cells 504 to change in response to the received control signal. In some embodiments of the present invention, the actuators of the plurality of grid cells 504 include a moving member that can move a grid cell from an initial position to a raised or lowered position or that can deform, rather than move, the surface in order to create a shape/texture change. For example, in some embodiments of the present invention, individual grid cells or a subset of grid cells of the plurality of moveable grid cells 504 may be altered by actuators to create a distinct pixel shape change to display one or more objects to a user.

In some embodiments of the present invention, reconfigurable display surface 500 and/or control circuit 506 are further include illumination device(s), such as a backlight LED, that are operatively coupled to grid 502, in which the illumination devices are configured to emanate light within a spectrum, for example, an RGB spectrum. In some embodiments of the present invention, reconfigurable display surface 500 and/or control circuit 506 are configured to send light-up signals to the illumination device(s) such that each cell, subset of cells, or plurality of moveable grid cells 504 of grid 502 are caused to display a particular color or sets of colors. In some embodiments of the present invention, reconfigurable display surface 500 and/or control circuit 506 include touch sensor(s) that are operatively coupled to the grid 502. For example, in some embodiments of the present invention, each cell of the plurality of moveable cells 504 of grid 504 is equipped with a touch sensor.

Although several of the embodiments described herein reference a moveable surface that has a grid comprising a plurality of moveable cells positioned in rows and columns, it should be understood that the present disclosure is not limited to a plurality of moveable cells being in a grid or orthogonal arrays, but can be generally applicable to moveable cells arranged in any number of dimensions and/or orientations. For example, in some embodiments of the present invention, the plurality of grid cells 504 are arranged in a diagonal, concentric circle, three-dimensional, random, or other suitable orientations.

In some embodiments of the present invention, reconfigurable display surface 500 includes or is operatively coupled to a control circuit 506, in which the control circuit 506 is capable of sending signals to the plurality of moveable cells 504 to move the plurality of moveable cells 504. In some embodiments of the present invention, control circuit 506 is operatively coupled to reconfigurable display surface 500 or to one or more components of reconfigurable display surface 500 via a direct or indirect connection between the control circuit 506 and one or more components of reconfigurable display surface 500 and/or a direct or indirect connection between control circuit 506 and reconfigurable display surface 500 itself. For example, as shown in FIG. 5B, in some embodiments of the present invention, control circuit 506 is operatively coupled to reconfigurable display surface 500 by being attached to the plurality of moveable cells 504. Thus in some embodiments of the present invention, control circuit 506 is a component of reconfigurable display surface 500, and in some embodiments of the present invention, control circuit 506 is a component that is separate from the reconfigurable display surface 500. The control circuit 506 may communicate with reconfigurable display surface 500 and/or components of reconfigurable display surface 500 via one or more suitable interfaces or connections, such as for example, a physical connection or a network connection (e.g., network 406 of FIG. 4).

Referring back to FIG. 4, in general mapping system 404 is configured to dynamically reform a reconfigurable display surface (e.g., reconfigurable display surface 500) to deliver physicality to a user for tactile map-based navigation. In some embodiments of the present invention, mapping system 404 is configured to receive an input destination for a user (e.g., via destination detection component 408), generate a navigational route to the destination based on a current location of the user (e.g. via navigational route generation component 410 and database 414), and transmit a control signal to the reconfigurable display surface to cause the mobile display surface to render the navigational route on a map of a geographic area (e.g., via control signal generation component 412). In some embodiments of the present invention, the rendering of the navigational route includes changing topography of the reconfigurable display surface such that a first three-dimensional (3D) shape is formed on the map at a position of the current location and a second 3D shape is formed on the map at a position of the destination. In some embodiments of the present invention, database(s) 414 houses information pertaining to the destinations, and/or information pertaining to routes to destinations. For example, in some embodiments of the present invention database(s) 414 is used to generate and/or obtain routes to destinations and identify assigned shapes to destinations.

Figure 6:
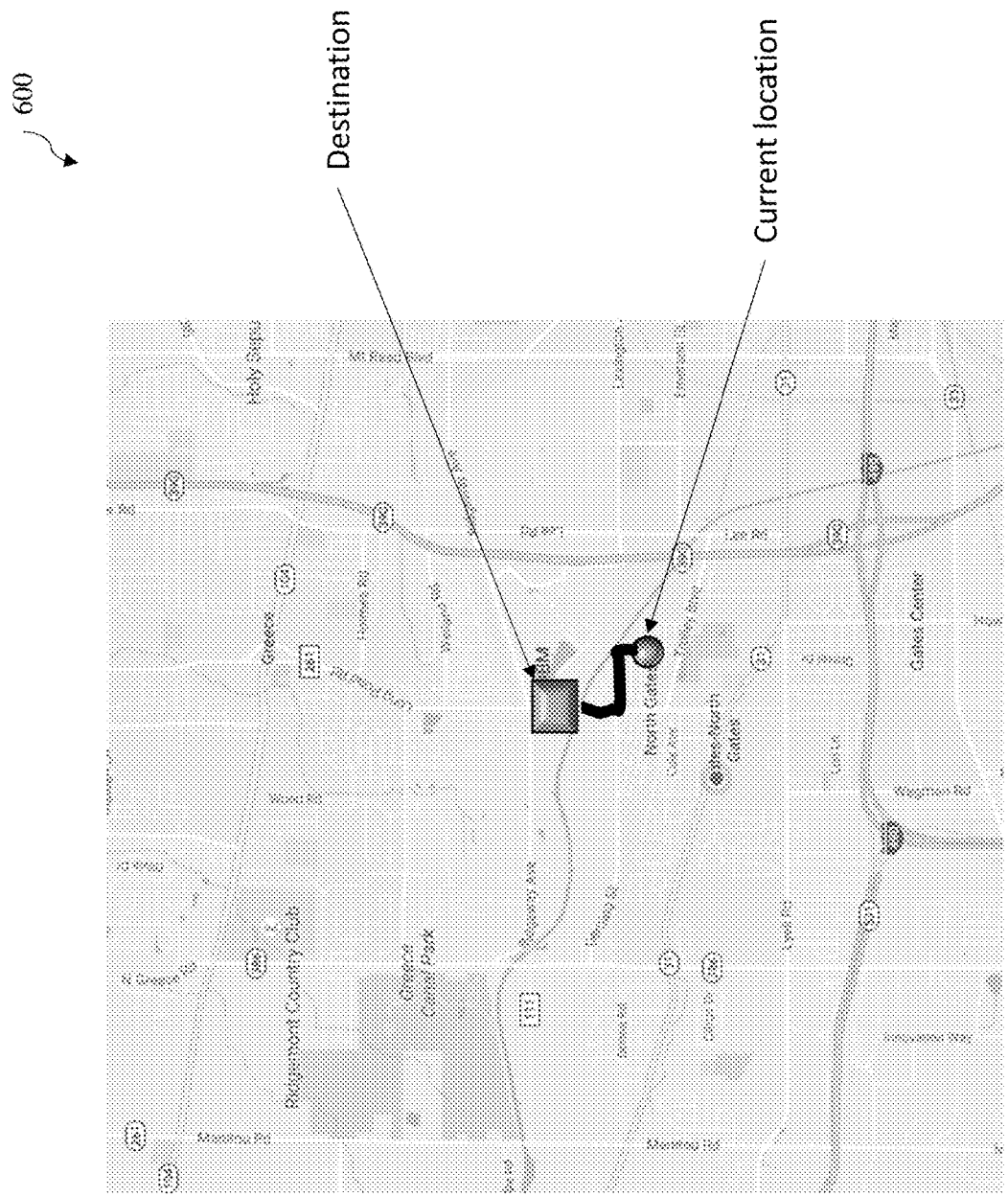
FIG. 6 depicts a top down view of an example graphical map that is displayed in accordance with one or more embodiments of the present invention.

FIG. 6 depicts a top down view of an example graphical map 600 that is displayed via a reconfigurable display surface in accordance with one or more embodiments of the present invention, in which graphical map 600 includes a current location point and a destination position having raised areas.

In the example depicted in FIG. 6, a user of mapping system 404 provides mapping system 404 with an intended destination. In some embodiments of the present invention, mapping system 404 comprises a GPS navigation device having a display that is used to provide the user with map (e.g., via reconfigurable display surface 500 of FIG. 5A-5B). In some embodiments of the present invention, mapping system 404 utilizes GPS to obtain a current location of the user and utilizes the current location of the user to generate a route to the intended destination. In some embodiments of the present invention, the user provides mapping system 404 with the destination via one or more input interfaces, such as for example, a microphone, a keyboard, a touch screen, etc. that is directly or indirectly connected to a display device such as reconfigurable display surface 500. For example, in some embodiments of the present invention, the user speaks out loud an intended destination, and then mapping system 404 applies speech recognition to speech captured by a microphone to identify the requested destination (e.g., audio that is captured by a microphone of reconfigurable display surface 500).

In prior systems, once a user begins navigating, a dot appears on the screen showing the user's current location along a path to an endpoint, in which the endpoint of the path is the user's destination. In contrast, in some embodiments of the present invention, mapping system 404 supports a current single destination by displaying a GPS route from a current location point to a destination point, and placing a raised 3D object at both the current location point and the destination point. In some embodiments of the present invention, in order to distinguish between each location point, the current location point and the destination point are assigned different shapes (e.g., as a rectangle and a circle). For example, in some embodiments of the present invention, mapping system 404 assigns the destination point a raised rectangular shape whereas the user's current location point is assigned a raised circular shape. Various other suitable shapes may be assigned and raised (e.g., stars, triangles, prisms, etc.). In some embodiments of the present invention, each location point is assigned a shaped based on pre-established settings that are set by the system and/or by the user. For example, in some embodiments of the present invention, user of mapping system 404 enters into mapping system 404 one or more shapes that are to be utilized by mapping system 404 when making assignments of raised objects.

In some embodiments of the present invention, mapping system 404 is configured to move the position of one or more of the raised objects as the current location of the user changes as a result of the user navigating along the displayed GPS route. Mapping system 404 allows for superimposing and moving the objects presented on a display (e.g., reconfigurable display surface 500), which provides the user with the ability to identify their current location and relative distance from the current location to the intended destinations via touching and feeling the raised objects on the map. For example, as the user navigates toward the destination point, the raised current location object is drawn closer to the raised destination object along the displayed GPS route.

In some embodiments of the present invention, mapping system 404 is configured to, in response to receiving a touch of the raised current location object by the user, identify itself as the current location and announce the distance to the destination. In some embodiments of the present invention, mapping system 404 is configured to, in response to receiving a touch of the raised destination location object by the user, identify itself as the destination and announce the name and/or address of the destination. The user can accomplish these functions with hand alone, and never needs to focus on the GPS display. In some embodiments of the present invention, mapping system 404 announces the current location, the destination, and/or the distance to the destination via a speaker of mapping system 404 and/or via haptic feedback provided to the user. For example, in some embodiments of the present invention, the distance to the destination is announced by providing haptic feedback to the user in response to a user touching the raised destination object or the raised current location object, in which the closer the current location becomes to the destination, the higher the magnitude and/or rapidity of haptic feedback becomes.

In some embodiments of the present invention, mapping system 404 is configured to provide haptic feedback to the user (e.g., via reconfigurable display surface 500) in response to the user touching the raised current location object and/or the raised destination object during the navigation to the destination and/or during the selection of the destination. For example, in some embodiments of the present invention, haptic feedback of increasing magnitude or rapidity is provided as the raised current location object moves towards the raised destination object during navigation.

In some embodiments of the present invention, both the current location point and the destination point are assigned a same raised shape on the map, and the current location point and the destination point are assigned different haptic feedback patterns such that the user may be able to distinguish between the points by identifying a particular haptic feedback pattern. For example, in some embodiments of the present invention, mapping system 404 provides a first haptic feedback to the user (e.g., via reconfigurable display surface 500) in response to the user touching the raised current location object, and mapping system 404 provides a second different haptic feedback to the user in response to the user touching the raised destination object. Various single and/or multiple haptic feedback patterns may be provided to the user. For example, in some embodiments of the present invention, a first haptic feedback is provided that includes one haptic feedback vibration, and a second haptic feedback is provided that includes two haptic feedback vibrations. Other suitable haptic feedback patterns may be utilized to identify each point as being the current location and/or destination.

Figure 7:
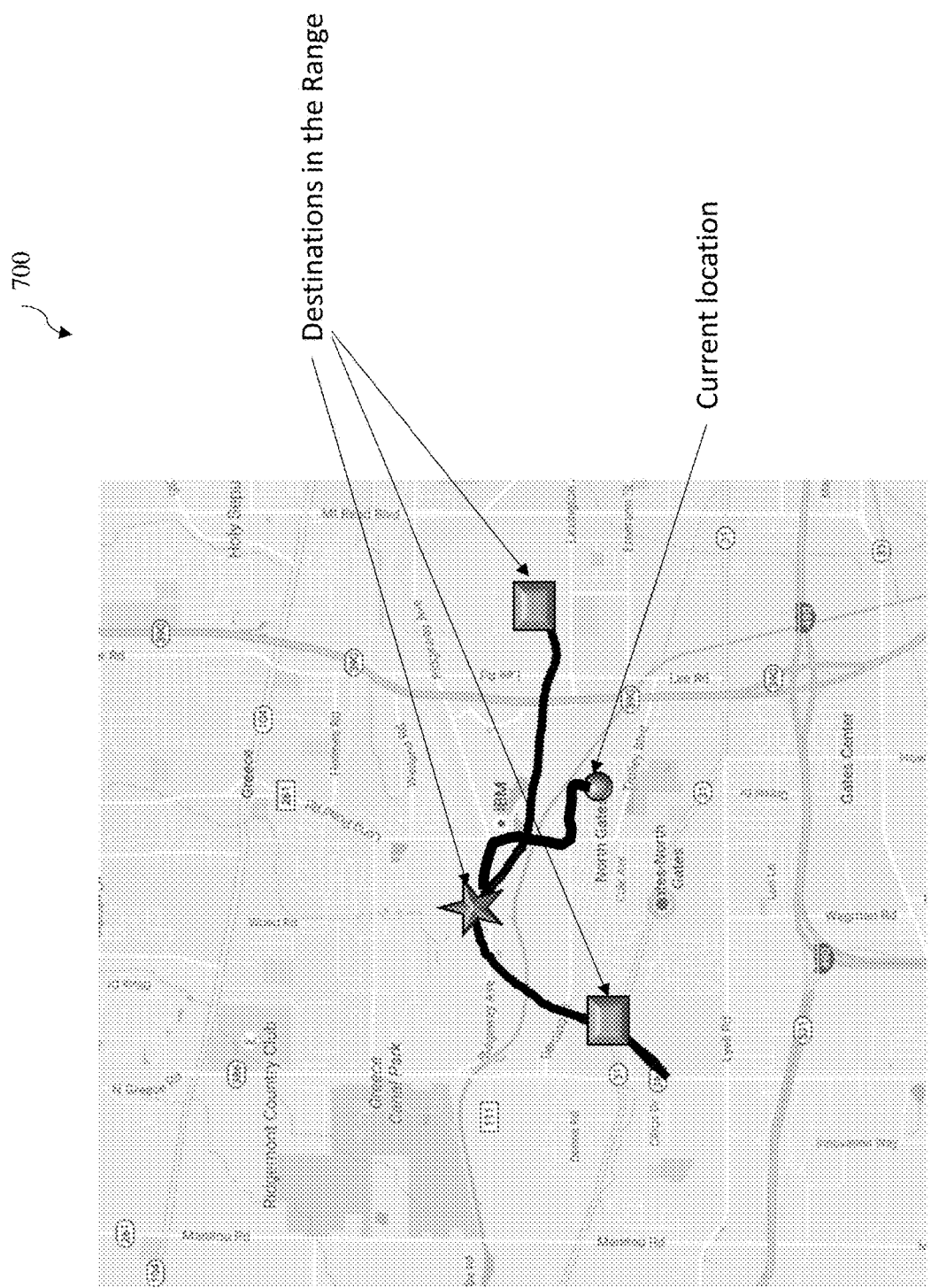
FIG. 7 depicts a top down view of another example graphical map that is displayed in accordance with one or more embodiments of the present invention

FIG. 7 depicts a top down view of another example graphical map 700 that is displayed via a reconfigurable display surface in accordance with one or more embodiments of the present invention, in which graphical map 700 includes a range of destination locations. In the example depicted in FIG. 7, mapping system 404 is configured to allow the user to enter a range of destinations for a given area. In some embodiments of the present invention, the range of destinations is a list of one or more potential destinations from which one destination is ultimately selected to be navigated to. In some embodiments of the present invention, the range of destinations is a list of one or more destinations that are each navigated to in sequential or non-sequential order. In one example scenario, the user may request that mapping system 404 identify fast food restaurants located within a certain area (e.g., city, zip code, neighborhood, etc.).

As shown in FIG. 7, in some embodiments of the present invention, in response to receiving a specified range of destinations, mapping system 404 displays a poly-line that extends through each of the destination points in the range of destinations, in which the destinations are presented by forming a raised 3D object. The currently selected destination is represented by a raised star object. In some embodiments of the present invention, the user selects the current destination by touching one of the raised possible destinations. In some embodiments of the present invention, the user is provided with haptic feedback to signify a selection of the current destination. As the user navigates toward the currently selected destination (i.e., a first destination of the range of destinations), mapping system 404 draws the raised current location object closer to the raised current destination object. In some embodiments of the present invention, the user may feel for, then press/touch the raised current location object on the display device (e.g., reconfigurable display surface 500) and mapping system 404 then, in response, identifies itself as the current location (e.g. via speaker and/or haptic feedback) and announces the distance to the currently selected destination (e.g., via speaker and/or haptic feedback). In some embodiments of the present invention, if the user touches/presses the raised current destination object, the device will identify itself as the destination and announce the name and/or address of the destination. Similar to the above, the user can accomplish these functions with hand alone, and never needs to focus on the GPS display.

Once the user arrives at the selected destination, the user may wish to be navigated to another destination of the range of destinations (i.e., a second destination of the range of destinations). Various scenarios may cause a user to wish to be navigated to a different destination of the range of destinations. For example, if the range of destinations are restaurant locations, and if the user selects a first restaurant as being the first destination and navigates to the restaurant, the user may wish to navigate to a second restaurant if the user recognizes that the first restaurant is too crowded.

In some embodiments of the present invention, mapping system 404 is configured to allow the user to switch between destinations in response to receiving a touch input on the display device (e.g., reconfigurable display surface 500). For example, in some embodiments of the present invention, in response to the user holding down the raised current location object, mapping system 404 cycles through the destinations in the range of destinations by announcing the distance to the next closest destination. If the user releases the raised current location object at this time, then the next closest location that was announced becomes the current destination. However, if the user wishes to select a different destination than the next closest destination, they can continue to hold down the current location raised area, and mapping system 404 will announce the second nearest destination, which the user may select by releasing the raised current location object. If all possible destinations are cycled through, mapping system 404 may start over and announces the closest destination once more. In some embodiments of the present invention, instead of cycling through the range of destinations in response to holding down the raised current location object, mapping system 404 cycles through the destinations in the range of input destinations in response to the user holding the raised current destination object. In some embodiments of the present invention, haptic feedback is provided to the user to signify confirmation of a particular selection and/or to signify a point in the cycling of the range of destination. For example, in some embodiments of the present invention, haptic feedback is provided to the user to signify when the cycling is starting over and/or when an end of the cycling has been reached.

Figure 8:
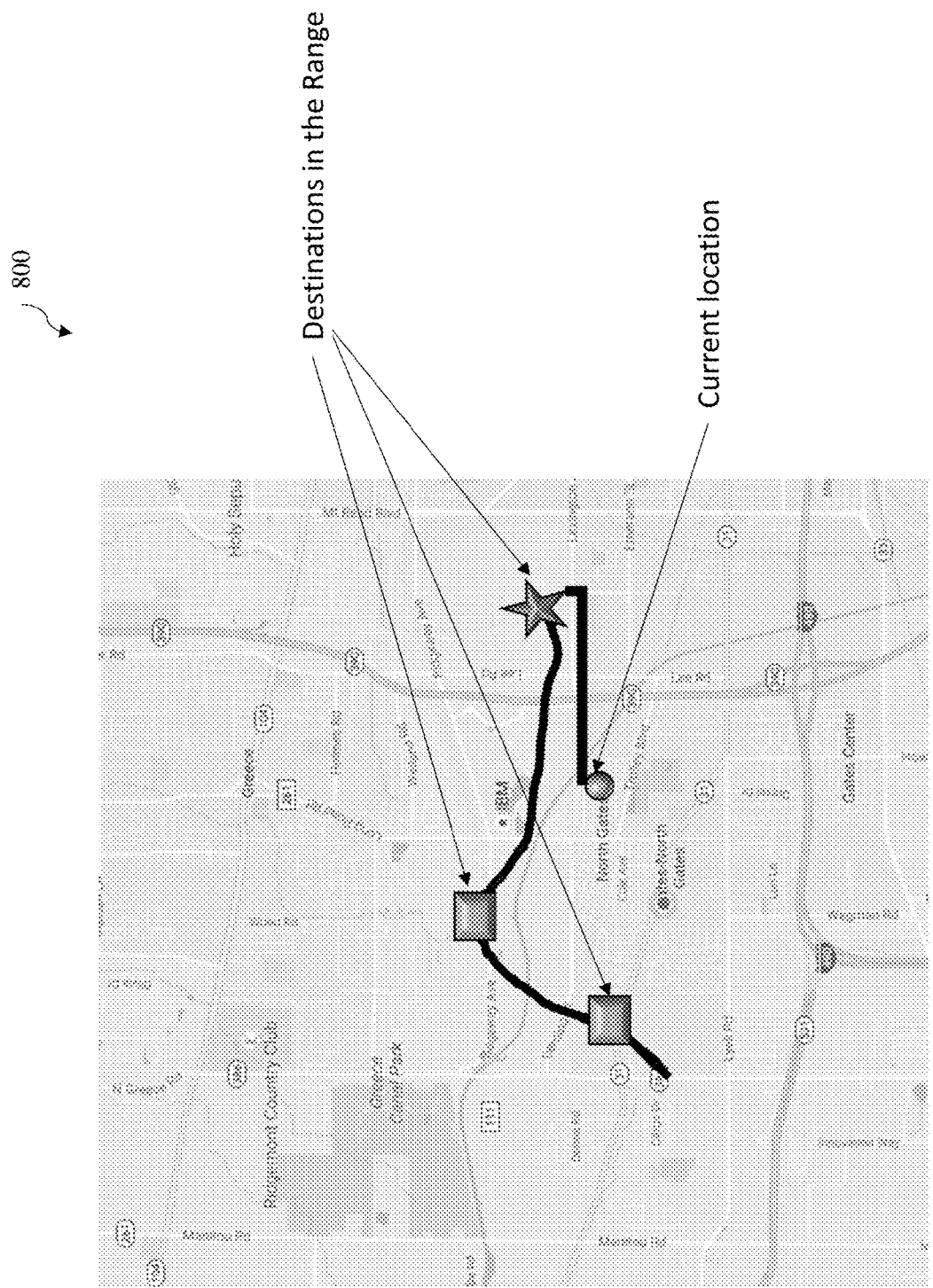
FIG. 8 depicts a top down view of another example graphical map that is displayed in accordance with one or more embodiments of the present invention.

FIG. 8 depicts a top down view of another example graphical map 800 that is displayed via a reconfigurable display surface in accordance with one or more embodiments of the present invention, in which graphical map 800 is a subsequent view of graphical map 700, in which graphical map 800 includes a route that is generated for a second destination of a range of destinations. In some embodiments of the present invention, instead of cycling through the range of destinations in response to holding down the raised current location object and/or holding down the raised current destination object, mapping system 404 selects a next destination to be the second destination based on the user touching an individual raised destination object. For example, in some embodiments of the present invention, the user touches each of the raised destination objects in the range of destinations until mapping system 404 announces the name of a particular destination (e.g., a name of a second restaurant). The user then double taps the raised destination object of the desired destination, and mapping system 404 selects the touched object as being the new destination (i.e., second destination). In the example shown in FIG. 8, mapping system 404 then calculates a new route, and updates the displayed map by adjusting the route and the location of the raised destination objects.

In some embodiments of the present invention, mapping system 404 is configured to provide a three dimensional GPS route in addition to, or alternatively to a raised destination object and/or raised current location object. In some embodiments of the present invention, the user employs the raised path to explore alternate routes from the current location to the destination. For example, in some embodiments of the present invention, after mapping system 404 generates the raised path, alternate routes from the current location to the current destination are identified in response to the user holding the raised path. Similar to the above, the alternate routes may be cycled through in response to the user holding the raised path. As the alternate routes are identified, mapping system 404 announces information about the alternate route, which can include distance, traffic, number of restaurants, number of gas stations, and/or other suitable route information. An alternate path is selected upon the user releasing the hold of the raised path.

In some embodiments of the present invention, rather than holding down the raised path to cycle through alternative routes, moving to the next possible route is accomplished by tapping the raised route. For example, in some embodiments of the present invention, in response to the user single tapping the raised route, mapping system 404 cycles to a next alternative route each time a single touch tap of on the raised route is provided by the user. In some embodiments of the present invention, in response to the user double tapping the raised route, mapping system 404 returns the route to the previous route identified such that the user can go back to a previously explored route.

Figure 9:
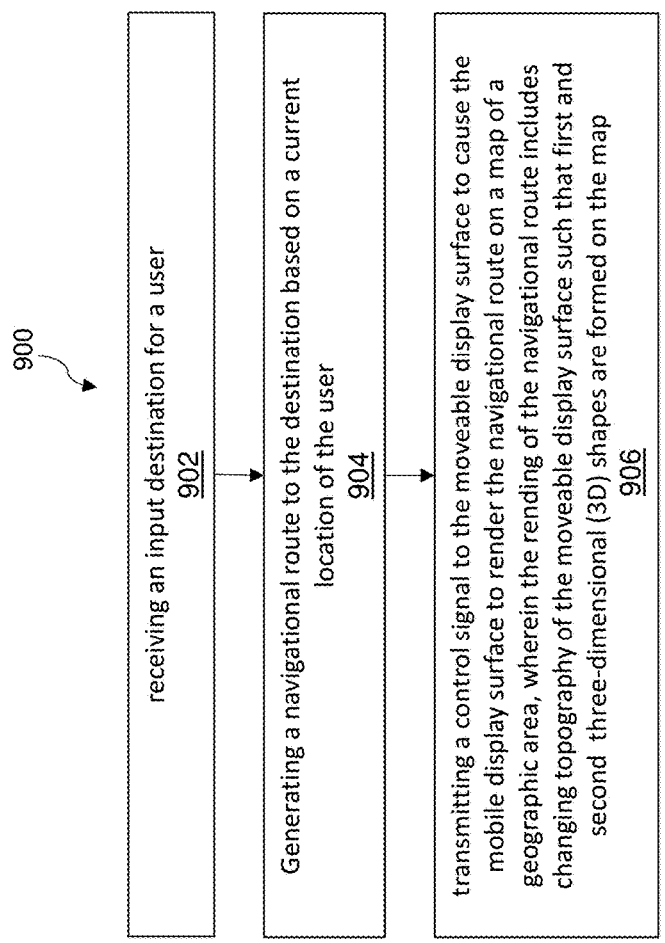
FIG. 9 depicts a flow diagram illustrating another example methodology in accordance with one or more embodiments of the present invention.

Additional details of the operation of mapping system 404 will now be described with reference to FIG. 9, wherein FIG. 9 depicts a flow diagram illustrating a methodology 900 according to one or more embodiments of the present invention. At 902, an input destination for a user is received. At 904, a navigational route to the destination is generated based on a current location of the user. At 906, a control signal is transmitted to the reconfigurable display surface to cause the mobile display surface to render the navigational route on a map of a geographic area. In some embodiments of the present invention, the rendering of the navigational route includes changing topography of the reconfigurable display surface such that a first three-dimensional (3D) shape is formed on the map at a position of the current location and a second 3D shape is formed on the map at a position of the destination. In some embodiments of the present invention, the transmission of the control signal further causes haptic feedback to be provided to the user in response to a touch by the user of at least one of the first 3D shape or the second 3D shape.

In some embodiments of the present invention, the reconfigurable display surface is configured to announce a distance to the destination in response to receiving a touch by the user of the first 3D shape. In some embodiments of the present invention, wherein the reconfigurable display surface is configured to announce at least one of a name of the destination or address of the destination in response to receiving a touch by the user of the second 3D shape.

In some embodiments of the present invention, methodology 900 further includes transmitting a second control signal to the reconfigurable display surface to cause the reconfigurable display surface to position the first 3D shape closer to the position of the second 3D shape on the reconfigurable display surface as the current location of the user approaches the destination.

In some embodiments of the present invention, the input destination that is received includes a range of input destinations, in which the destination of the navigational route is a first destination of the range of input destinations. In some embodiments of the present invention, methodology 900 further includes transmitting a second control signal to the reconfigurable display surface to cause the reconfigurable display surface to render a third 3D shape on the map for each destination of the range of input destinations other than the first destination, and rendering a polyline on the map, in which the polyline connects each destination in the range of input destinations. The destination the navigational route is then changed from the first destination to a second destination of the range of input destinations, in which the second destination is selected in response to receiving a touch input by the user in which the user touches the first 3D shape for a period of time. The reconfigurable display surface is configured to cycle, during the period of time, between destinations of the range of input destinations.

In some embodiments of the present invention, the rendering of the navigational route further includes changing topography of the reconfigurable display surface such that a 3D line representation of the navigational route is formed on the map. In some embodiments of the present invention, methodology 900 further generates one or more alternate navigational routes to the destination based on the current location of the user, selecting an alternate navigational route of the one or more alternate navigational routes in response to receiving a touch by the user of the 3D line, and transmitting a second control signal to the reconfigurable display surface to cause the reconfigurable display surface to render the selected alternate navigational route.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for tactile map-based navigation on a reconfigurable display surface, the method comprising:
receiving, by a system comprising one or more processors, an input destination for a user;
generating, by the system, a navigational route to the destination based on a current location of the user; and
transmitting, by the system, a control signal to the reconfigurable display surface to cause the reconfigurable display surface to render the navigational route on a map of a geographic area, wherein the rendering of the navigational route includes physically changing a topography of the reconfigurable display surface such that a first three-dimensional (3D) shape is formed on the map at a position of the current location and a second 3D shape is formed on the map at a position of the destination,
wherein the configuration display surface comprises a plurality of movable grid cells and the physically changing a topography comprises altering a height or depth of one or more of the movable grid cells on the surface of the configurable display surface, and the transmission of the control signal further causes haptic feedback comprising a vibration to be provided to the user in response to a touch by the user of at least one of the first 3D shape or the second 3D shape.

2. The computer-implemented method of claim 1 further comprising:

transmitting a second control signal to the reconfigurable display surface to cause the reconfigurable display surface to position the first 3D shape closer to the position of the second 3D shape on the reconfigurable display surface as the current location of the user approaches the destination.

3. The computer-implemented method of claim 1, wherein the reconfigurable display surface is configured to announce a distance to the destination in response to receiving a touch by the user of the first 3D shape.

4. The computer-implemented method of claim 1, wherein the reconfigurable display surface is configured to announce at least one of a name of the destination or address of the destination in response to receiving a touch by the user of the second 3D shape.

5. The computer-implemented method of claim 1, wherein receiving the input destination includes receiving, by the system, a range of input destinations for the user, wherein the destination of the navigational route is a first destination of the range of input destinations, wherein the method further includes:

transmitting a second control signal to the reconfigurable display surface to cause the reconfigurable display surface to render a third 3D shape on the map for each destination of the range of input destinations other than the first destination, and rendering a polyline on the map, wherein the polyline connects each destination in the range of input destinations; and changing the destination of the navigational route from the first destination to a second destination of the range of input destinations, wherein the second destination is selected in response to receiving a touch input by the user in which the user touches the first 3D shape for a period of time, wherein the reconfigurable display surface is configured to cycle, during the period of time, between destinations of the range of input destinations.

6. The computer-implemented method of claim 1, wherein the rendering of the navigational route further includes changing topography of the reconfigurable display surface such that a 3D line representation of the navigational route is formed on the map, wherein the method further includes:

generating one or more alternate navigational routes to the destination based on the current location of the user;

selecting an alternate navigational route of the one or more alternate navigational routes in response to receiving a touch by the user of the 3D line; and transmitting a second control signal to the reconfigurable display surface to cause the reconfigurable display surface to render the selected alternate navigational route.

7. A computer program product for tactile map-based navigation on a reconfigurable display surface, the computer program product comprising a non-transitory computer readable storage medium having program instructions embodied therewith, the program instructions executable by a system comprising one or more processors to cause the system to perform a method, the method comprising:

receiving, by the system, an input destination for a user;

generating, by the system, a navigational route to the destination based on a current location of the user; and transmitting, by the system, a control signal to the reconfigurable display surface to cause the reconfigurable display surface to render the navigational route on a map of a geographic area, wherein the rendering of the navigational route includes physically changing a topography of the reconfigurable display surface such that a first three-dimensional (3D) shape is formed on the map at a position of the current location and a second 3D shape is formed on the map at a position of the destination, wherein the configuration display surface comprises a plurality of movable grid cells and the physically changing a topography comprises altering a height or depth of one or more of the movable grid cells on the surface of the configurable display surface, and the transmission of the control signal further causes haptic feedback comprising a vibration to be provided to the user in response to a touch by the user of at least one of the first 3D shape or the second 3D shape.

8. The computer program product of claim 7, wherein the method further includes:

transmitting a second control signal to the reconfigurable display surface to cause the reconfigurable display surface to position the first 3D shape closer to the position of the second 3D shape on the reconfigurable display surface as the current location of the user approaches the destination.

9. The computer program product of claim 7, wherein the reconfigurable display surface is configured to announce a distance to the destination in response to receiving a touch by the user of the first 3D shape.

10. The computer program product of claim 7, wherein the reconfigurable display surface is configured to announce at least one of a name of the destination or address of the destination in response to receiving a touch by the user of the second 3D shape.

11. The computer program product of claim 7, wherein receiving the input destination includes receiving, by the system, a range of input destinations for the user, wherein the destination of the navigational route is a first destination of the range of input destinations, wherein the method further includes:

transmitting a second control signal to the reconfigurable display surface to cause the reconfigurable display surface to render a third 3D shape on the map for each destination of the range of input destinations other than the first destination, and rendering a polyline on the map, wherein the polyline connects each destination in the range of input destinations; and changing the destination of the navigational route from the first destination to a second destination of the range of input destinations, wherein the second destination is selected in response to receiving a touch input by the user in which the user touches the first 3D shape for a period of time, wherein the reconfigurable display surface is configured to cycle, during the period of time, between destinations of the range of input destinations.

12. The computer program product of claim 7, wherein the rendering of the navigational route further includes changing topography of the reconfigurable display surface such that a 3D line representation of the navigational route is formed on the map, wherein the method further includes:

generating one or more alternate navigational routes to the destination based on the current location of the user;

selecting an alternate navigational route of the one or more alternate navigational routes in response to receiving a touch by the user of the 3D line; and transmitting a second control signal to the reconfigurable display surface to cause the reconfigurable display surface to render the selected alternate navigational route.

13. A system for tactile map-based navigation on a reconfigurable display surface, the system comprising one or more processors configured to perform a method, the method comprising:

receiving, by the system, an input destination for a user;

generating, by the system, a navigational route to the destination based on a current location of the user; and transmitting, by the system, a control signal to the reconfigurable display surface to cause the reconfigurable display surface to render the navigational route on a map of a geographic area, wherein the rendering of the navigational route includes physically changing a topography of the reconfigurable display surface such that a first three-dimensional (3D) shape is formed on the map at a position of the current location and a second 3D shape is formed on the map at a position of the destination, wherein the configuration display surface comprises a plurality of movable grid cells and the physically changing a topography comprises altering a height or depth of one or more of the movable grid cells on the surface of the configurable display surface, and the transmission of the control signal further causes haptic feedback comprising a vibration to be provided to the user in response to a touch by the user of at least one of the first 3D shape or the second 3D shape.

14. The system of claim 13, wherein the method further includes:

transmitting a second control signal to the reconfigurable display surface to cause the reconfigurable display surface to position the first 3D shape closer to the position of the second 3D shape on the reconfigurable display surface as the current location of the user approaches the destination.

15. The system of claim 13, wherein the reconfigurable display surface is configured to announce a distance to the destination in response to receiving a touch by the user of the first 3D shape, and to announce at least one of a name of the destination or address of the destination in response to receiving a touch by the user of the second 3D shape.

16. The system of claim 13, wherein receiving the input destination includes receiving, by the system, a range of input destinations for the user, wherein the destination of the navigational route is a first destination of the range of input destinations, wherein the method further includes:

transmitting a second control signal to the reconfigurable display surface to cause the reconfigurable display surface to render a third 3D shape on the map for each destination of the range of input destinations other than the first destination, and rendering a polyline on the map, wherein the polyline connects each destination in the range of input destinations; and changing the destination of the navigational route from the first destination to a second destination of the range of input destinations, wherein the second destination is selected in response to receiving a touch input by the user in which the user touches the first 3D shape for a period of time, wherein the reconfigurable display surface is configured to cycle, during the period of time, between destinations of the range of input destinations.

17. The system of claim 13, wherein the rendering of the navigational route further includes changing topography of the reconfigurable display surface such that a 3D line representation of the navigational route is formed on the map, wherein the method further includes:

generating, by the system, one or more alternate navigational routes to the destination based on the current location of the user;

selecting, by the system, an alternate navigational route of the one or more alternate navigational routes in response to receiving a touch by the user of the 3D line; and transmitting a second control signal to the reconfigurable display surface to cause the reconfigurable display surface to render the selected alternate navigational route.

* * * * *